United States Patent
Meyers

(10) Patent No.: US 12,423,091 B1
(45) Date of Patent: Sep. 23, 2025

(54) SYSTEMS AND METHODS FOR NON-INTERRUPTIVE UPDATE

(71) Applicant: Apple Inc., Cupertino, CA (US)

(72) Inventor: Libo Cao Meyers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/233,219

(22) Filed: Aug. 11, 2023

Related U.S. Application Data

(63) Continuation of application No. 17/412,669, filed on Aug. 26, 2021, now Pat. No. 11,782,699.

(60) Provisional application No. 63/071,880, filed on Aug. 28, 2020.

(51) Int. Cl.
| | | |
|---|---|---|
| *G06F 9/44* | (2018.01) | |
| *G06F 8/656* | (2018.01) | |
| *H04L 67/00* | (2022.01) | |

(52) U.S. Cl.
CPC .............. *G06F 8/656* (2018.02); *H04L 67/34* (2013.01)

(58) Field of Classification Search
None
See application file for complete search history.

(56) References Cited

U.S. PATENT DOCUMENTS

| | | |
|---|---|---|
| 6,633,878 B1 | 10/2003 | Underwood |
| 8,713,551 B2 | 4/2014 | Douglas et al. |
| 9,400,643 B2 | 7/2016 | Poiesz et al. |
| 9,542,172 B2 | 1/2017 | Alsina et al. |
| 9,715,378 B2 | 7/2017 | Dickerson et al. |
| 9,740,259 B2 * | 8/2017 | Bourdelles ............ G06F 9/5094 |
| 10,114,634 B2 | 10/2018 | Quin et al. |
| 10,140,109 B2 | 11/2018 | Tobolski et al. |
| 10,630,538 B2 | 4/2020 | Kim et al. |
| 11,252,079 B2 | 2/2022 | Michael et al. |
| 11,538,454 B2 | 12/2022 | Korbecki |
| 11,586,428 B1 | 2/2023 | Mair et al. |
| 2004/0031030 A1 | 2/2004 | Kidder et al. |
| 2007/0214333 A1 | 9/2007 | Nijhawan et al. |
| 2009/0300595 A1 | 12/2009 | Moran et al. |
| 2010/0218170 A1 | 8/2010 | MacLellan et al. |
| 2011/0307882 A1 | 12/2011 | Shiba |

(Continued)

OTHER PUBLICATIONS

Roberto Baldoni, et al., "Distributed Event Routing in Publish/Subscribe Communication Systems: a Survey," Published in 2005, 27 pages.

(Continued)

*Primary Examiner* — Qamrun Nahar
(74) *Attorney, Agent, or Firm* — Polsinelli, PC

(57) ABSTRACT

Implementations described herein provide systems and methods for a non-interruptive software update for a device. In one implementation, a software update for a critical node of a node system network of a controller of the device is detected. The node system network utilizes a publisher-subscriber framework. The software update is installed, and the critical node continues to operate in the publisher-subscriber framework during the software update. The software update creates an updated node. The updated node is subscribed to the publisher-subscriber framework, and the critical node is replaced with the updated node within the publisher-subscriber framework by switching subscriber information from the critical node to the updated node.

18 Claims, 11 Drawing Sheets

(56) References Cited

U.S. PATENT DOCUMENTS

| | | | | |
|---|---|---|---|---|
| 2012/0258725 | A1* | 10/2012 | Yi | H04W 4/50 455/456.1 |
| 2015/0112591 | A1* | 4/2015 | Kim | G01C 21/32 701/532 |
| 2016/0294614 | A1* | 10/2016 | Searle | G06F 8/654 |
| 2018/0007040 | A1* | 1/2018 | Thom | H04L 63/0442 |
| 2018/0189046 | A1 | 7/2018 | Kunisetty et al. | |
| 2020/0394031 | A1* | 12/2020 | Kim | G06F 8/65 |
| 2021/0394645 | A1* | 12/2021 | McFarland, Jr. | B60R 21/01516 |
| 2021/0403016 | A1* | 12/2021 | Jung | G06F 8/65 |

OTHER PUBLICATIONS

Emre Yigitoglu, et al., Foggy: A Framework for Continuous Automated IoT Application Deployment in Fog Computing, IEEE 6th International Conference on AI & Mobile Services, 2017, 8 pages.

\* cited by examiner

SYSTEMS AND METHODS FOR NON-INTERRUPTIVE UPDATE

CROSS-REFERENCE TO RELATED APPLICATIONS

The present application is a Continuation of U.S. patent application Ser. No. 17/412,669, entitled "Systems and Methods for Non-Interruptive Update," filed on Aug. 26, 2021, which claims benefit of priority to U.S. Provisional Patent Application No. 63/071,880, entitled "Systems and Methods for Non-Interruptive Update," filed on Aug. 28, 2020. Each of these applications is specifically incorporated by reference in its entirety herein.

FIELD

Aspects of the present disclosure relate to systems and methods for providing a non-interruptive software update and more particularly to updating software for a device without interrupting operation of the device.

BACKGROUND

Devices, such as mobile devices, generally operate using hardware and software. The software may be periodically updated to optimize performance, provide new or improved functionality, address concerns, and/or the like. Typically, a device restricts access to the software until installation of a software update is complete. As such, during the installation, the device is unable to execute any operations.

SUMMARY

Implementations described and claimed herein address the foregoing problems by providing systems and methods for a non-interruptive software update for a device. In one implementation, a software update for a critical node of a node system network of a controller of the device is detected. The node system network utilizes a publisher-subscriber framework. The software update is installed, and the critical node continues to operate in the publisher-subscriber framework during the software update. The software update creates an updated node. The updated node is subscribed to the publisher-subscriber framework, and the critical node is replaced with the updated node within the publisher-subscriber framework by switching subscriber information from the critical node to the updated node.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for providing a non-interruptive software update for a device, such as a mobile device. Where a software update is needed for critical operations, the software update is installed while critical operations continue. In some instances, where the controller has insufficient computing resources to execute the software update, non-critical operations are squeezed until the software updated is complete, at which time the non-critical operations are expanded back out.

The various systems and methods disclosed herein generally provide for a non-interruptive software update for a device, such that operation of the device continues without interruption during a software update. It will be appreciated by those skilled in the art that the presently disclosed technology is applicable to various devices, including but not limited to mobile devices, robots, aerial vehicles, aerospace vehicles, submersible vehicles, ground vehicles, personal vehicles, user devices, personal computers, workstations, terminals, smartphones, tablets, multimedia consoles, and/or other computing devices and machines. In some examples herein, the implementations are described with respect to a mobile device, which may include an autonomous machine, such as an autonomous vehicle.

Figure 1:
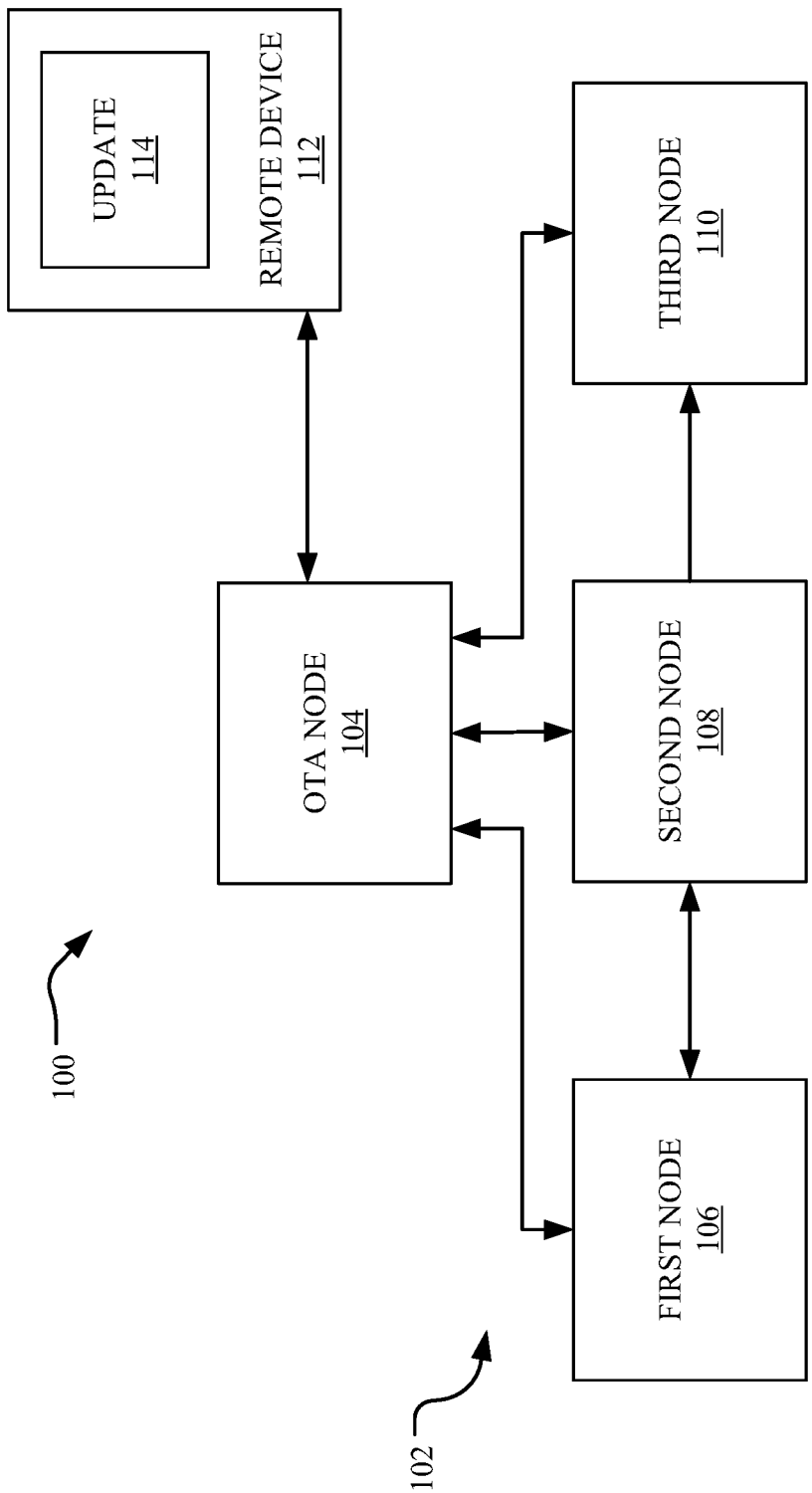
FIG. 1 is a diagram of an example controller for a device, such as a mobile device, providing a non-interruptive software update in a publisher-subscriber framework of a node system network.

To begin a detailed description of a non-interruptive software update, reference is made to FIG. 1. Autonomous vehicles are capable of operating to move along the travel path with limited user input. Stated differently, rather than the user being operationally engaged to control the actions of the autonomous vehicle, the user may provide instructions, such as one or more destination points, and the autonomous vehicle transports the user to the selected destination points through a series of autonomous decisions.

In one implementation, the autonomous vehicle includes a controller 100 for controlling operations of the autonomous vehicle. A plurality of dedicated machine components are in communication over the controller 100, with each of the dedicated machine components providing a primary function for the autonomous vehicle. However, it may be appreciated that each dedicated machine component has a primary function, it may also have additional functions as well. In one implementation, the controller 100 is a dedicated node system network where the dedicated machine components are nodes communicating based on their own needs. For example, the controller 100 may utilize a publisher-subscriber framework involving a messaging pattern where messages are published to the controller 100 and characterized into classes. The nodes may subscribe to any of the classes to receive corresponding messages. Thus, one node may receive information without knowledge of what publishers, if any, exist. Similarly, the node may publish messages to the controller 100 without knowledge of what subscribers, if any, exist.

Stated differently, the controller 100 may include a distributed graph framework in which autonomy software is implemented for controlling the autonomous vehicle. The distributed graph framework may be a node system network 102 having a plurality of nodes operating within a publisher-subscriber framework. Each node is generally a process or a thread for one or more operations of the autonomous vehicle, and a node graph is composed of related software processes or threads. More particularly, the controller 100 may include various computing resources, such as one or more central processing units (CPU), one or more graphics processing units (GPU), disk space, memory, network constraints (bandwidth, data pipeline saturation between nodes, network links), and/or the like. As one example, the controller 100 may include a plurality of computers wired as a distributed computer. Each of the computers is associated with a plurality of nodes and various computing resources. Nodes within and between the computers communicate with each other via corresponding data pipelines. Software is deployed onto the distributed computer via a node graph of a plurality of nodes. Each node defines itself as a subscriber, a publisher, or both within the publisher-subscriber framework. As a subscriber, a node receives information published by other nodes to which it is subscribed, and as a publisher, a node publishes information that other nodes subscribing to the node receive.

Some nodes may be both a publisher and a subscriber. Critical nodes are often both a publisher and subscriber. During initial deployment of the node system network 102, each node defines itself as critical or non-critical, such that the nodes have self-identifying criticality. Critical nodes are generally those nodes that without the underlying functionality of the nodes, the autonomous vehicle is unable to operate. For example, nodes underlying autonomous decisions, perception, navigation, and/or motion planning for the autonomous vehicle are critical nodes. On the other hand, nodes that involve event logging, non-time-sensitive functions, situation specific nodes (e.g., nodes corresponding to a function that only occurs within a specific scenario), and/or the like are non-critical nodes. Non-critical nodes are generally those nodes that are unnecessary in generating autonomous decisions or otherwise keeping the autonomous vehicle in operation.

As a simplified example, the node system network 102 of FIG. 1 includes an Over the Air (OTA) node 104, a first node 106, a second node 108, and a third node 110. It will be appreciated, however, that the example of FIG. 1 is exemplary only for illustrating the presently disclosed technology, and the node system network 102 may include a myriad of other nodes cross one or more computers and associated with a variety of computing resources of the controller 100. As an example, the first node 106 may be an image processing node, and the second node 108 may be a motion planning node. As an image processing node, the first node 106 may obtain LIDAR data from one or more LIDAR sensor sources, for example as a LIDAR point cloud. Stated differently, the first node 106 subscribes to LIDAR sources to receive LIDAR information. The first node 106 processes the LIDAR point cloud to generate and publish perception information identifying one or more objects in the LIDAR point cloud. In this manner, the first node 106 is obtaining hardware information and translating it into digital form for output in a data pipeline for subscribing nodes to receive and utilize.

For example, the second node 108 subscribes to the first node 106 to obtain perception information generated based on LIDAR information. The second node 108 may similarly subscribe to other nodes publishing perception information generated based on various types of sensor information. Using the perception information, the second node 108 may generate a motion plan for navigating the autonomous vehicle within an environment through a series of autonomous operations. The second node 108 publishes the motion plan, and the various subscribing nodes, including nodes corresponding to subcomponents of the autonomous vehicle (e.g., controlling acceleration, braking, turning, etc.), receive the information for use in their underling processes or threads. In this example, the first node 106 and the second node 108 are each critical nodes, as the autonomous vehicle would be unable to execute and generate autonomous operations and/or decisions without the nodes 106-108.

On the other hand, the third node 110 may be an event logging node for recording information upon detection of a specific event. For example, some autonomous vehicles may be deployed in a fleet where information is crowd sourced. When an autonomous vehicle detects a specific event, for example, a navigation condition, such as a slippery road, the third node 110 may record information pertaining to the navigation condition for communicating to other autonomous vehicles. Such information may include the motion planning information, such that the third node 110 subscribes to the second node 106, among others. In this example, the third node 110 is a non-critical node, as the autonomous vehicle remains able to execute and generate autonomous operations and/or decisions without the third node 110.

In one implementation, the OTA node 104 communicates with a remote device 112 to identify available software updates for various aspects of the controller 100. The remote device 112 may be a central server(s) or other device(s) from which software updates are received for various aspects of the controller 100. The OTA node 104 may communicate with the remote device 112 via a wireless network and identify available software updates in various manners, and the software updates may be received at an update receiver in the controller 100, which is used as a hop to the node system network 102 running the OTA node 104. The update receiver may be hardware and/or software living on the node system network 102 or otherwise on the same entity as the OTA node 104.

In one example, the OTA node 104 may receive a notification from the remote device 112 regarding a software update 114 for LIDAR processing. The notification may include an identification of the nodes to which the software update 114 applies or the OTA node 104 may identify the relevant nodes based subscription information pertaining to LIDAR information. Similarly, the OTA node 104 may be notified or determine whether the software update 114 involves one or more critical nodes. As a simplified example, the software update 114 may be for the first node 106, which is a critical node.

Generally, the OTA node 104 prepares a software update based on whether the software update is a critical software update or a non-critical software update. Where the OTA node 104 determines that a software update is a non-critical update, the OTA node 104 may prepare the software update depending on available computing resources of the controller 100. For example, where there are insufficient computing resources available for a non-critical software update, the OTA node 104 may delay the non-critical software update until when the autonomous vehicle is not in use. On the other hand, where there are sufficient resources available for the non-critical software update, the OTA node 104 may commence the non-critical software update.

It is advantageous to avoid delay of critical software updates due to the insufficiency of computing resources. As such, where the OTA node 104 determines that a software update is a critical software update, the OTA proceeds with preparing the critical software update. In the simplified example of FIG. 1, the OTA node 104 may determine that the software update 114 is a critical update based on the association with the first node 106 as a critical node. For example, the software update 114 may include information indicating that the software update 114 is a critical software update. Because the software update 114 is a critical update, the OTA node 104 prepares the software update 114 for non-interruptive updating of the first node 106. During the non-interruptive update corresponding to the software update 114, the controller 100 continues to operate with the computing resources of the controller 100 being utilized in varying capacities. As such, after determining that the software update 114 will be implemented as a non-interruptive update, the OTA node 104 generates a computing resource computation.

Figure 2:
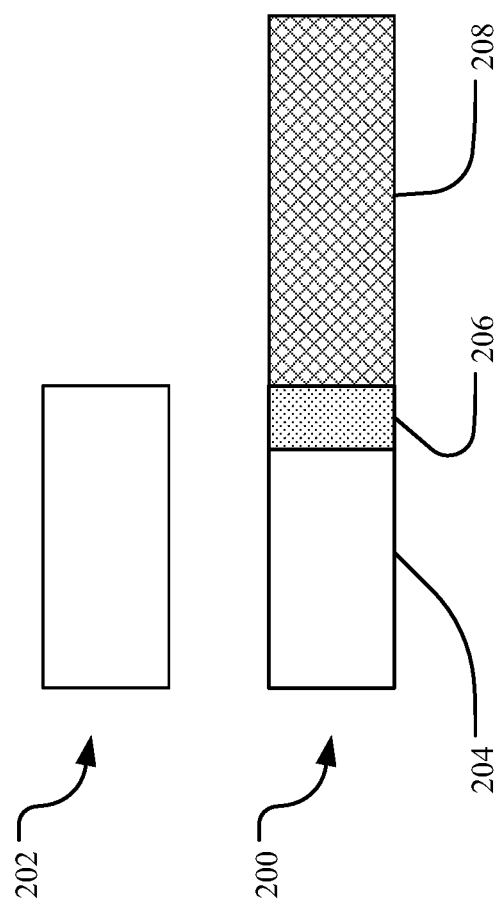
FIG. 2 is a diagram illustrating a calculation of a resource threshold compared to update resources associated with the software update.

Turning to FIG. 2, in one implementation, the computing resource computation involves a calculation of update resources 202 and computing resources 200 of the controller 100. The update resources 202 correspond to the computing resources of the controller 100 involved in the software update 114. Stated differently, the update resources 202 indicate an amount of the computing resources 200 needed to complete the software update 114. The OTA node 104 may determine the update resources 202 based on an indication in the software update 114. For example, the software update 114 may include information indicating that the software update 114 needs 2 CPUs to complete, and using the information, the OTA node 104 identifies the update resources 202 as 2 CPUs.

Once the OTA node 104 determines the update resources 202, the OTA node 104 calculates a resource threshold of the computing resources 200 of the controller 100. In one implementation, the resource threshold is calculated based on currently available computing resources 204 of the controller 100. The currently available computing resources 204 of the controller 100 correspond to the computing resources 200 that are not currently in use by the node system network 102 of the controller 100. In some implementations, the controller 100 maintains a tolerance level of computing resources 206 to ensure sufficient computing resources 200 remain available for critical operations of the autonomous vehicle at all times. For example, the tolerance level of computing resources 206 may correspond to a percentage of the computing resource 200 that remain available at all times. The resource threshold may further be calculated based on the tolerance level of computing resources 206. In one implementation, the OTA node 104 calculates unavailable computing resources 208 corresponding to the computing resources 200 in currently in use. Based on the known metrics of the computing resources 200, the calculation of the unavailable computing resources 208, and the tolerance level of computing resources 206, the OTA node 104 calculates the resource threshold corresponding to the currently available resources 204 of the controller 100. Based on the computing resources computation, the OTA node 104 determines how to proceed with installing the software update 114.

In one implementation, the OTA node 104 uses the computing resources computation to determine whether the update resources 202 are within the resource threshold, such that the currently available resources 204 are sufficient to implement the software update 114. For example, the update resources 202 may be 30% of the computing resources 200 needed to install the software update 114, and the tolerance level of computing resources 206 is 10%. When the OTA node 104 calculates the unavailable computing resources 208 to be 60% or less, the OTA node 104 determines that the update resources 202 are within the resource threshold. More particularly, the currently available computing resources 204 in this example would be 30% since the unavailable computing resources 208 is 60% and the tolerance level of the computing resources 206 is 10%. When the OTA node 104 determines that the update resources 202 are within the resource threshold, the OTA may proceed automatically with installing the software update 114.

On the other hand, as illustrated in the example of FIG. 2, the OTA node 104 may determine that the update resources 202 are above the resource threshold. For example, the update resources 202 may be 30% of the computing resources 200 needed to install the software update 114. The OTA node 104 may calculate the unavailable computing resources 208 to be 70%, such that there is 30% of the computing resources 200 not currently in use. However, the tolerance level of computing resources 206 is 10%. Accordingly, the currently available computing resources 204 in this example would be 20% since the unavailable computing resources 208 is 70% and the tolerance level of the computing resources 206 is 10%. Because the currently available computing resources 204 are 20% and the update resources 202 are 30%, the update resources 202 are above the resource threshold. When the OTA node 104 determines that the update resources 202 are above the resource threshold, the OTA node 104 may proceed automatically with squeezing to obtain additional computing resources from the unavailable computing resources 208. For example, the difference between the resource threshold and the currently available computing resources 204 is 10%, such that the OTA node 104 initiates squeezing to obtain additional computing resources, which in this example would be 10% or more of the computing resources 200.

Figure 3:
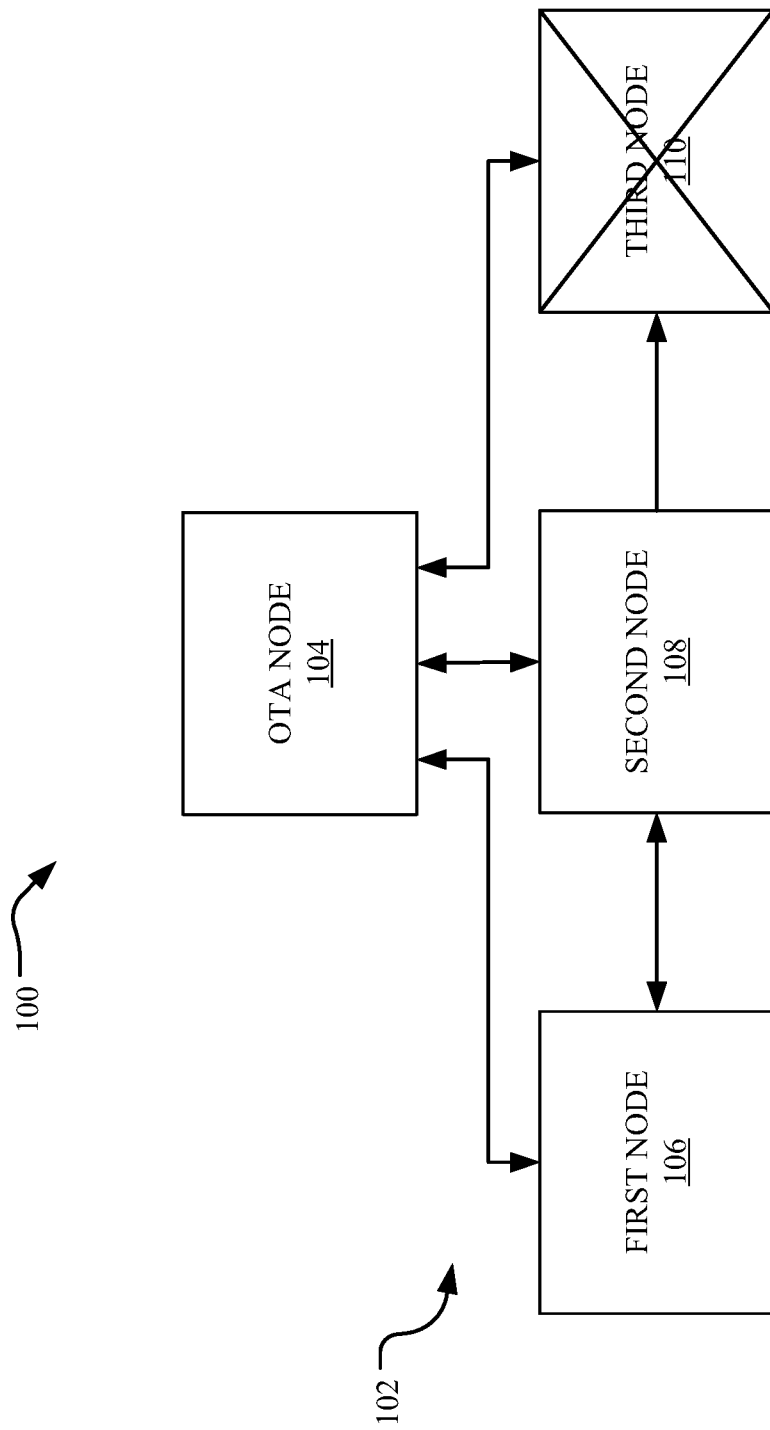
FIG. 3 illustrates squeezing non-critical nodes based on the comparison of the resource threshold to the update resources associated with the software update.

Turning to FIG. 3, in one implementation, the OTA node 104 mitigates the unavailable computing resources 208 by deactivating one or more non-critical nodes in the node system network 102 to free additional computing resources. This process is sometimes referred to as "squeezing" the computing resources 200 of the node system network 102. More particularly, the OTA node 104 performs resource squeezing recognizance by identifying one or more non-critical nodes that can be deactivated to obtain additional computing resources sufficient for the update resources 202 to be within the resource threshold and then automatically initiating deactivation of the corresponding one or more non-critical nodes. The OTA node 104 identifies non-critical nodes to deactivate, as any critical nodes are needed by the controller 100 for continuing operations of the autonomous vehicle. Further, each node, including non-critical nodes, has a buffer in memory, such that the node records information in the memory for a certain amount of time and/or capacity. As non-critical nodes are not needed for critical operations for the autonomous vehicle, losing information recorded by the non-critical node is not impactful, such that deactivating the node does not result in any loss of critical information. However, this information is stored in the buffer in local memory, where in most instances, loss of any information during deactivation is minimized or eliminated.

Figure 4:
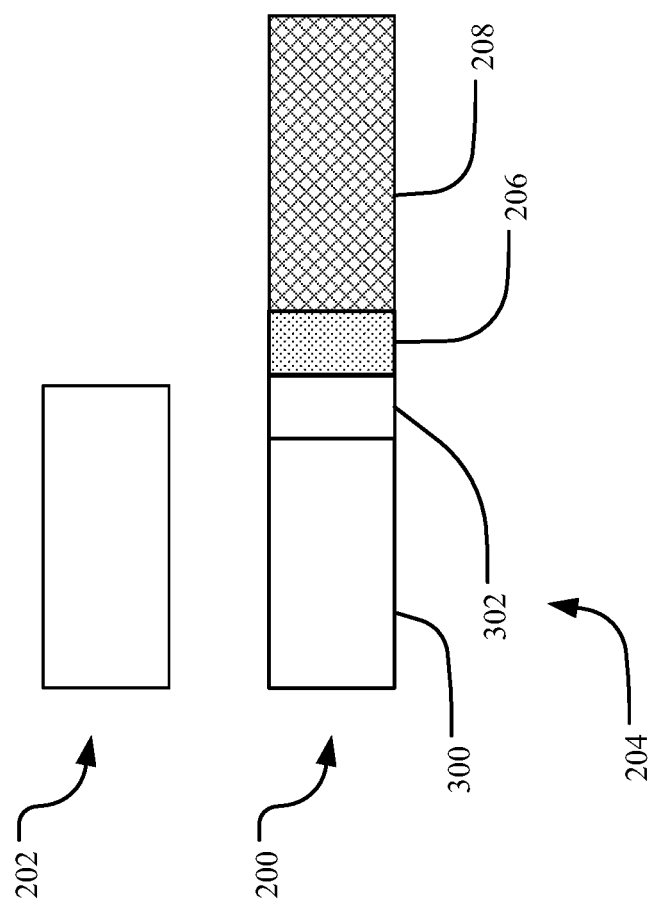
FIG. 4 depicts the impact of the squeezing on the resource threshold.

As shown in the example of FIG. 2, the difference between the resource threshold and the currently available computing resources 204 is 10%, such that the OTA node 104 initiates squeezing to obtain additional computing resources, which in this example would be 10% or more of the computing resources 200. Accordingly, as shown in FIG. 3 the OTA node 104 deactivates the third node 110, which is a non-critical node performing event logging related to record navigation conditions for communicating to other autonomous vehicles. As described above, the third node 110 may record event logging information within the buffer of local memory in instances where a navigation condition is detected during deactivation of the third node 110. Thus, even in the scenario in which the third node 110 becomes relevant is triggered during deactivation of the third node 110, information loss is minimized or eliminated. With the third node 110 deactivated through the squeezing, the currently available computing resources 204 increases. As shown in FIG. 4, the currently available computing resources 204 includes previously available computing resources 300 that were available prior to and remain available after the deactivation of the third node 110, as well as additional computing resources 300 freed through the deactivation of the third node 110.

Following the squeezing, the OTA node 104 generates an updated computing resources computation to determine whether the update resources 202 are within the resource threshold, such that the currently available resources 204, including the previously available computing resources 300 and the additional computing resources 300 are sufficient to implement the software update 114. In the example, the update resources 202 are 30% of the computing resources 200 needed to install the software update 114, and the tolerance level of computing resources 206 is 10%. When the OTA node 104 calculates the unavailable computing resources 208 to be 60% or less following the squeezing, the OTA node 104 determines that the update resources 202 are within the resource threshold. More particularly, the currently available computing resources 204 in this example would be 30% since the unavailable computing resources 208 is 60% and the tolerance level of the computing resources 206 is 10%. As such, the additional computing resources 300 freed through the deactivation of the third node 110 in this example is 10%. When the OTA node 104 determines that the update resources 202 are within the resource threshold, the OTA node 104 proceeds automatically with installing the software update 114 with the third node 110 remaining deactivated during the installation.

In some instances, no matter how the OTA node 104 squeezes the unavailable computing resources 208, the update resources 202 remain above the resource threshold. This may occur, for example, where a software update is a large update, where various critical operations are occurring concurrently, where other resource intensive situations are occurring, and/or the like. Accordingly, in such instances, the OTA node 104 may determine whether the software update can be separated into subsets, with each subset being installed separately within the resource threshold. The software update may be separated into subsets based on a relationship of portions of the software update to each other. In one example, a software update may involve a graph of four nodes. If two of the four nodes have a publisher-subscriber relationship with each other or otherwise work together, while the other two nodes are not tied to that relationship or functionality, the OTA node 104 may install the software update in separate portions: one subset for each set of interrelated nodes. Conversely, if the software update cannot be separated into subsets because the aspects all work together or if the software update is too resource intensive even separated into subsets, the OTA node 104 may schedule the software update as an interruptive software update. In this instance, the OTA node 104 may send a command to navigate the autonomous vehicle to a safe location for performing the interruptive software update.

Figure 5:
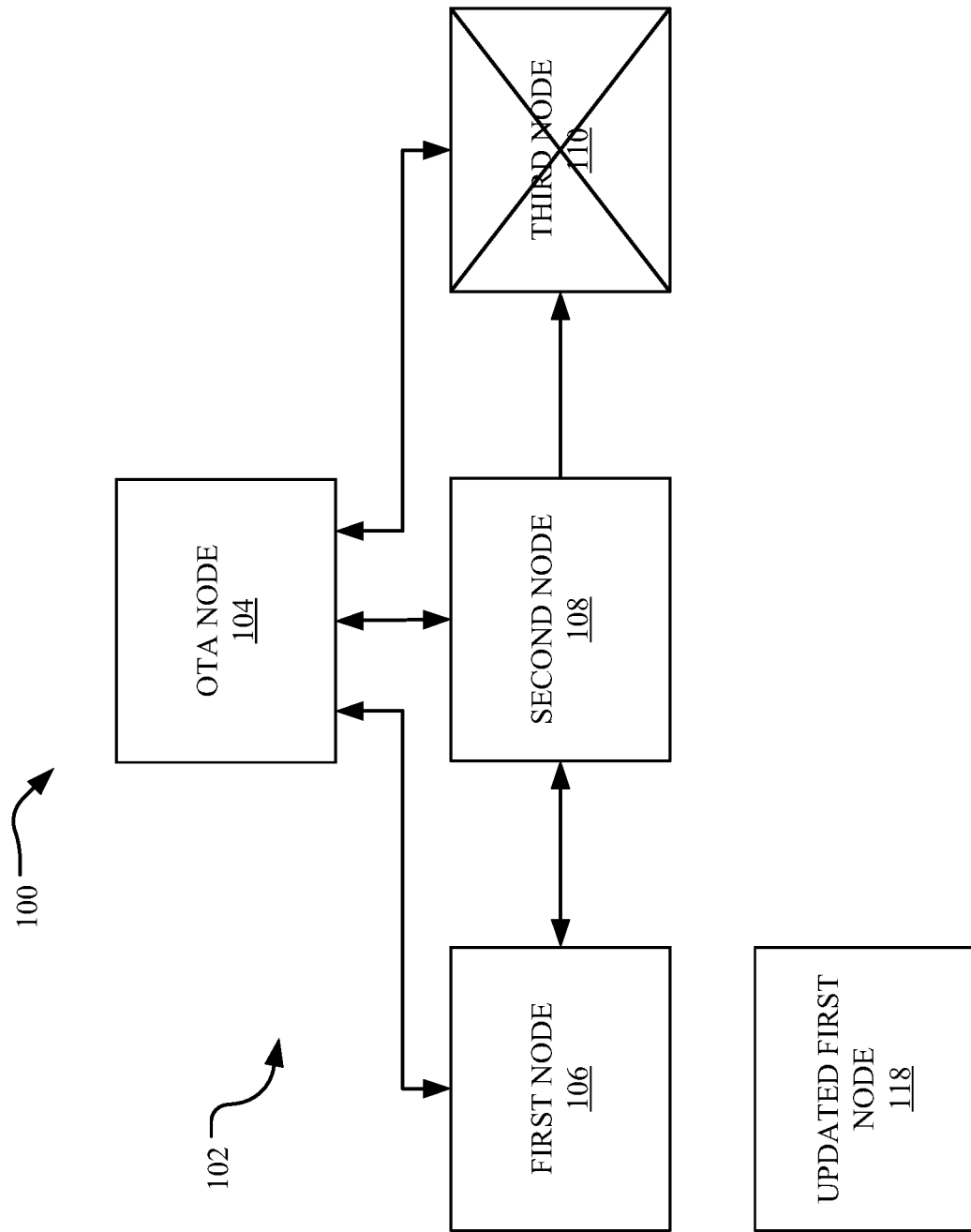
FIG. 5 shows an updated node created by the software update.

Returning to the example of FIGS. 2-4 where the OTA node 104 squeezes the additional computing resources 300, such that the update resources 202 are within the resource threshold, the OTA node 104 installs the software update 114. As shown in FIG. 5, the first node 106 continues to operate within the node system network 102 during the software update 114, which creates an updated node 118 for replacing the first node 106.

Generally, a new node graph of one or more updated nodes associated with a software update is installed within the node system network 102. However, the new node graph is not functioning within the node system network 102 until it is integrated into the publisher-subscriber framework. Stated differently, the nodes of the new node graph may be communicating with each other upon installation but not with other nodes within the node system network 102. Further, the old node graph that the new node graph is to replace continues to operate within the publisher-subscriber framework of the node system network 102. Stated differently, the new node graph is not being consumed by any other nodes in the node system network 102. The OTA node 104 evaluates the new node graph to validate performance of the new node graph. For example, the OTA node 104 may compare performance of the new node graph with the old node graph. Where the new node graph is performing the same as the old node graph as updated by the software update, the OTA node 104 may validate the performance of the new node graph. Upon validation that the new node graph is performing, the OTA node 104 attaches the new node graph with the node system network 102 and removes the old node graph from the node system network 102. A speed of the switch from the old node graph to the new node graph may be such that there is no interruption to critical operations of the autonomous vehicle. For example, the speed of the switch may be on the order of a few milliseconds.

For example, as shown in FIG. 5, while the updated node 118 is installed, the updated node 118 is not attached to the node graph of the node system network 102. The second node 108 is not subscribed to the updated node 118. Instead, the second node 108 remains subscribed to the first node 106. As described herein, in this example, the first node 106 and the second node 108 establish communication through a connector, with the connector being a data pipeline between them. The first node 106 defines itself as a subscriber to the second node 108, with all the information that the second node 108 publishes being communicated along the connector to the first node 106. The first node 106 defines itself as a publisher as well, with the second node 108 defining itself as a subscriber to the first node 106. Accordingly, the connector between the first node 106 and the second node 108 is a two way data pipeline.

Figure 6:
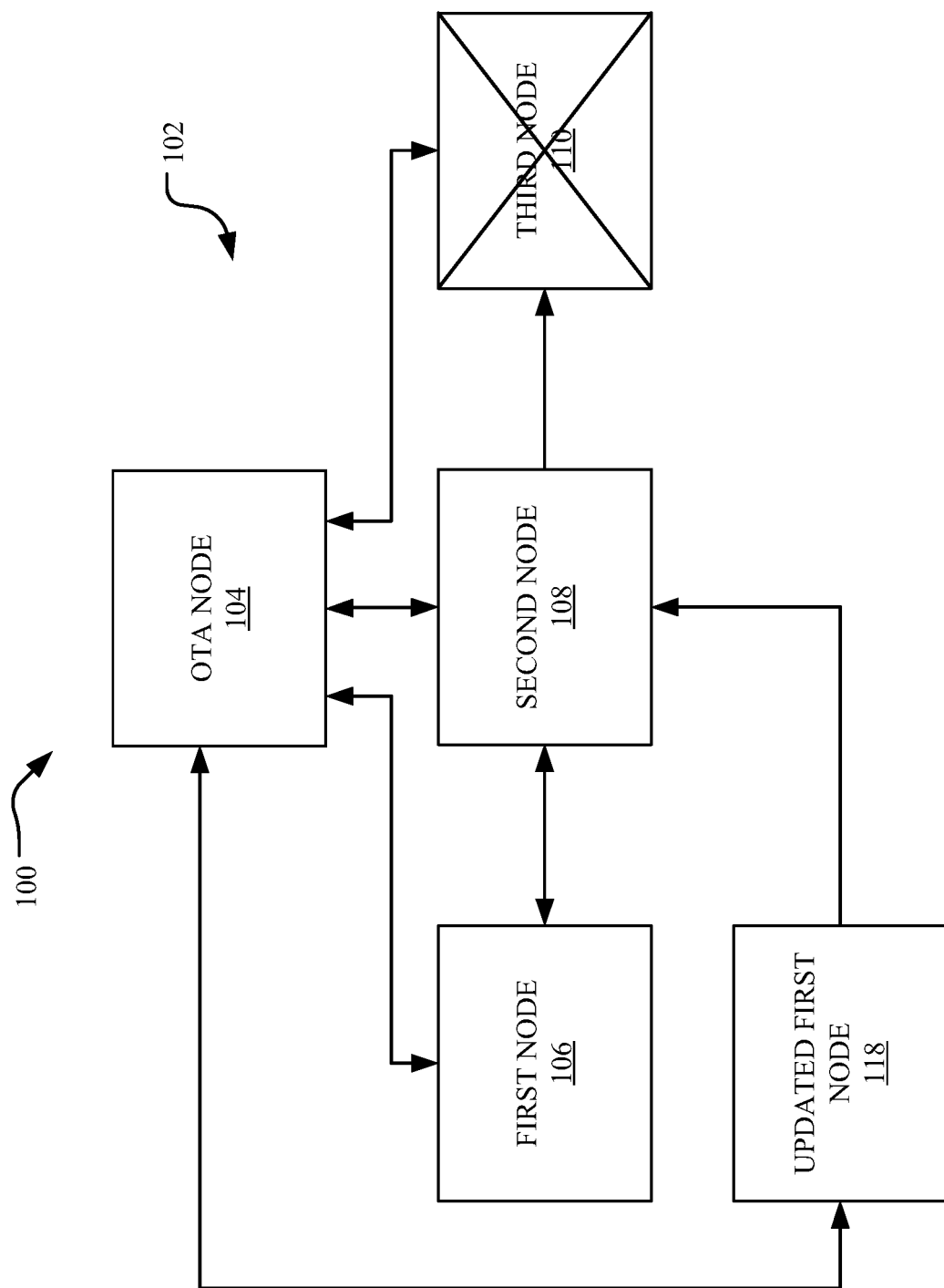
FIG. 6 illustrates the updated node subscribed to corresponding nodes within the publisher-subscriber framework.

When the updated node 118 is installed, the first node 106 and the second node 108 continue to communicate information along the two way data pipeline. The updated node 118 is online but it is not communicating within the node system network 102. To deploy the updated node 118 within the node system network 102, the OTA node 104 attaches the updated node 118 to the node system network 102. In one implementation, the OTA node 104 subscribes the updated node 118 to the nodes within the node system network 102 that the first node 106 is subscribed to or that the updated node 118 should be subscribed to according to the software update 114. For example, as shown in FIG. 6, the updated node 118 is subscribed to the second node 108. Using the information obtained through the subscription, the updated node 118 begins generating information. The updated node 118 publishes information, but at this point, no nodes within the node system network 102 outside of the OTA node 104 are subscribed to the updated node 118. Accordingly, the published information of the updated node 118 is not consumed. Instead, the first node 106 continues to publish information within the node system network 102 that is consumed. The OTA node 104 validates the information published by the updated node 118 to determine whether the updated node 118 is performing within expectations (e.g., according to the functionality of the first node 104 in view of the software update 114). More particularly, because the OTA node 104 is subscribed to both the first node 106 and the updated node 118, which are both subscribed to the same nodes (in this example the second node 108), the OTA node 104 can compare the information published by the first node 106 and the updated node 118 to validate performance of the updated node 118.

Figure 7:
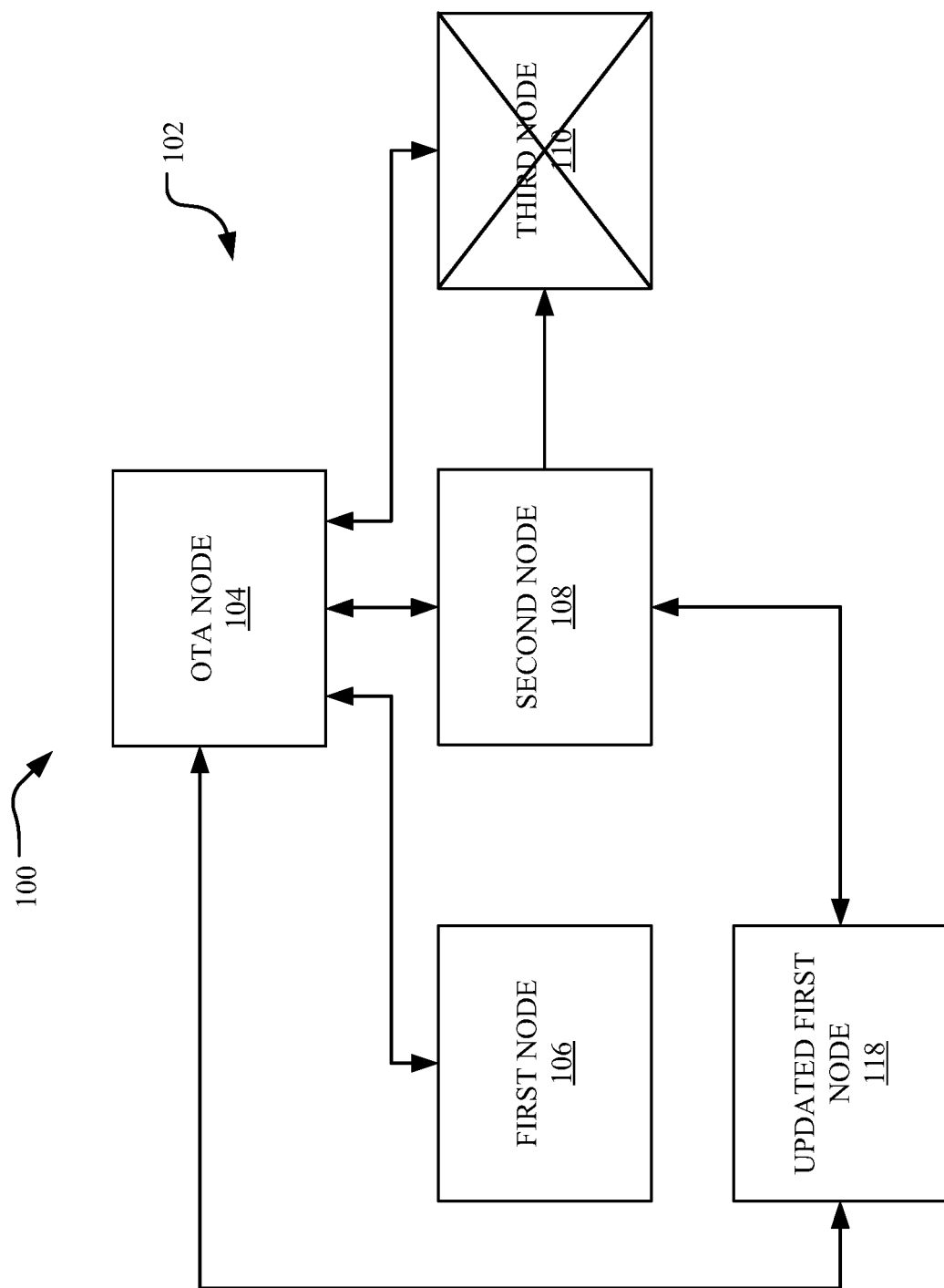
FIG. 7 depicts switching subscription information from the original node to the updated node within the publisher-subscriber framework.
Figure 8:
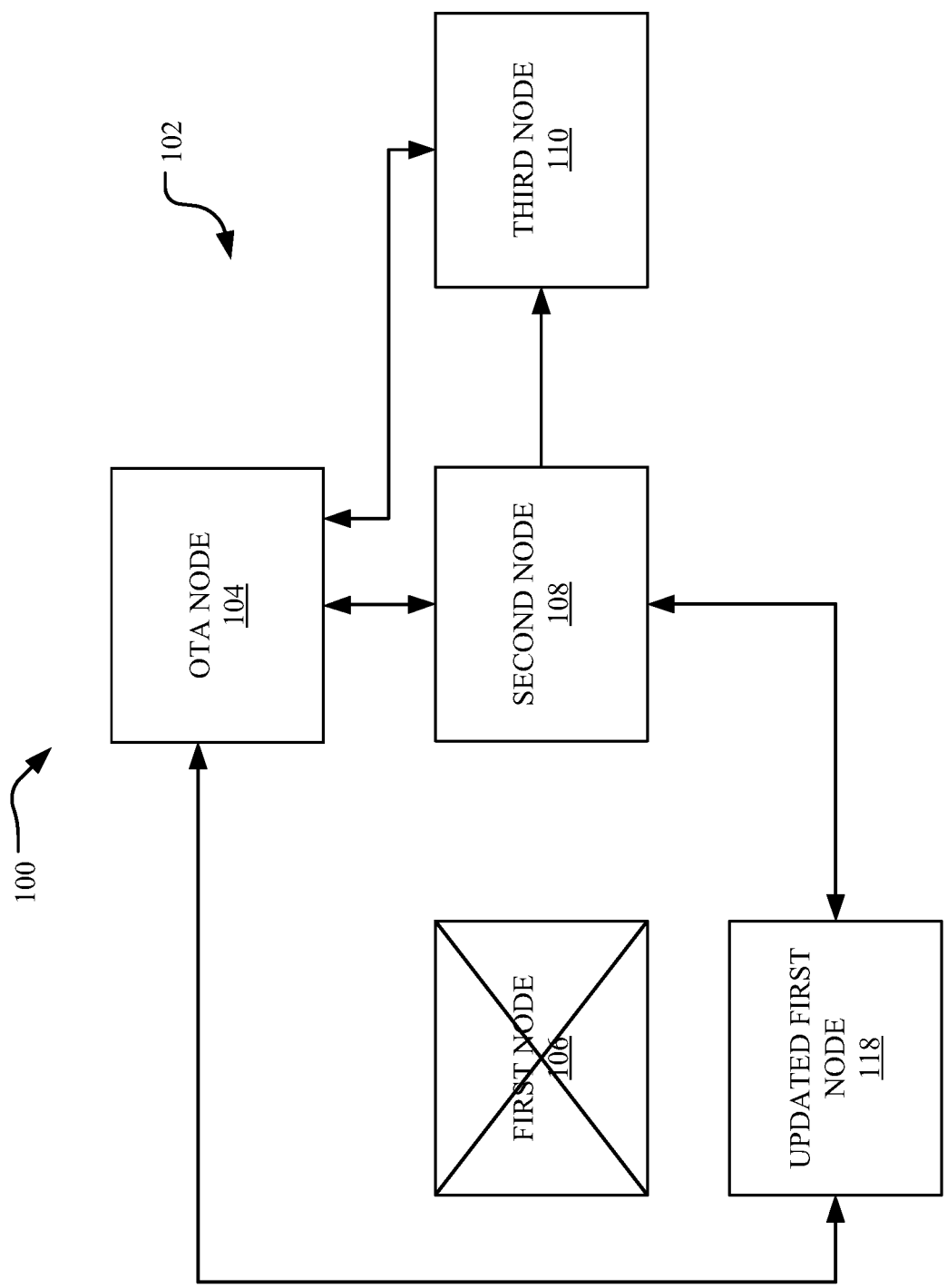
FIG. 8 shows the now obsolete original node being killed and the updated node operating within the publisher-subscriber framework.

Upon validation that the updated node 118 is performing according to expectations, the OTA node 104 replaces the first node 106 with the updated node 118. In one implementation, the OTA node 104 replaces the first node 106 with the updated node 118 by switching the subscription information from the first node 106 to the updated node 118, as illustrated in FIG. 7. At this point, the second node 108 is subscribed to the updated node 118 and no longer subscribed to the first node 106. In other words, the information published by the updated node 118 is consumed by the second node 108, and the information published by the first node 106 is no longer being consumed. The OTA node 104 may perform a second validation following replacement of the first node 106 by the updated node 118 to confirm the node system network 102 is performing within expectations in view of the software update 104. The first node 106 is now obsolete as it is no longer subscribing or publishing any information within the node system network 102. Accordingly, the OTA node 104 may kill the first node 106. Following the first node 106 being killed, the computing resources associated with the first node 106 are freed. As such, the OTA node 104 expands the additional computing resources 300 back out, such that the third node 110 may be reactivated, as shown in FIG. 8. As the functionality underlying the first node 106 and the updated node 118 continues uninterrupted during the entirety of the software update 114, as well as other critical operations of the autonomous vehicle, the software updated 114 is executed as a non-interruptive software update.

In some implementations, the first node 106 is stateless itself because it is reactive to information obtained through its subscriptions. Here, the state of the first node 106 is consistently changing based on the information published by other nodes within the node system network 102, such as the second node 108. In other implementations, the first node 106 has a state management as local memory. As such, the first node 106 would include a subscription to the local memory, and the updated node 118 would subscribe to the local memory to inherit the state information. In some instances the local storage format of the local memory may not be fitted to an adaptor of the updated node 118. Accordingly, the OTA node 104 initiates a data migration of the state information as the updated node 118 is spinning up. More particularly, the state information is migrated from the local memory for the first node 106 into a new data format that the updated node 118 can consume. In connection with the validation of the performance of the updated node 118 prior to switching the subscription information from the first node 106 to the updated node 118, the OTA node 104 may verify that the state information is migrated into the data format for the updated node 118. The OTA node 104 switches the subscription information from the first node 106 to the updated node 118, rendering the first node 106 and its local memory obsolete. The OTA node 104 kills the first node 106 and erases the local memory, thereby freeing additional computing resources for expanding the non-critical nodes that were deactivated following the squeeze.

Figure 9:
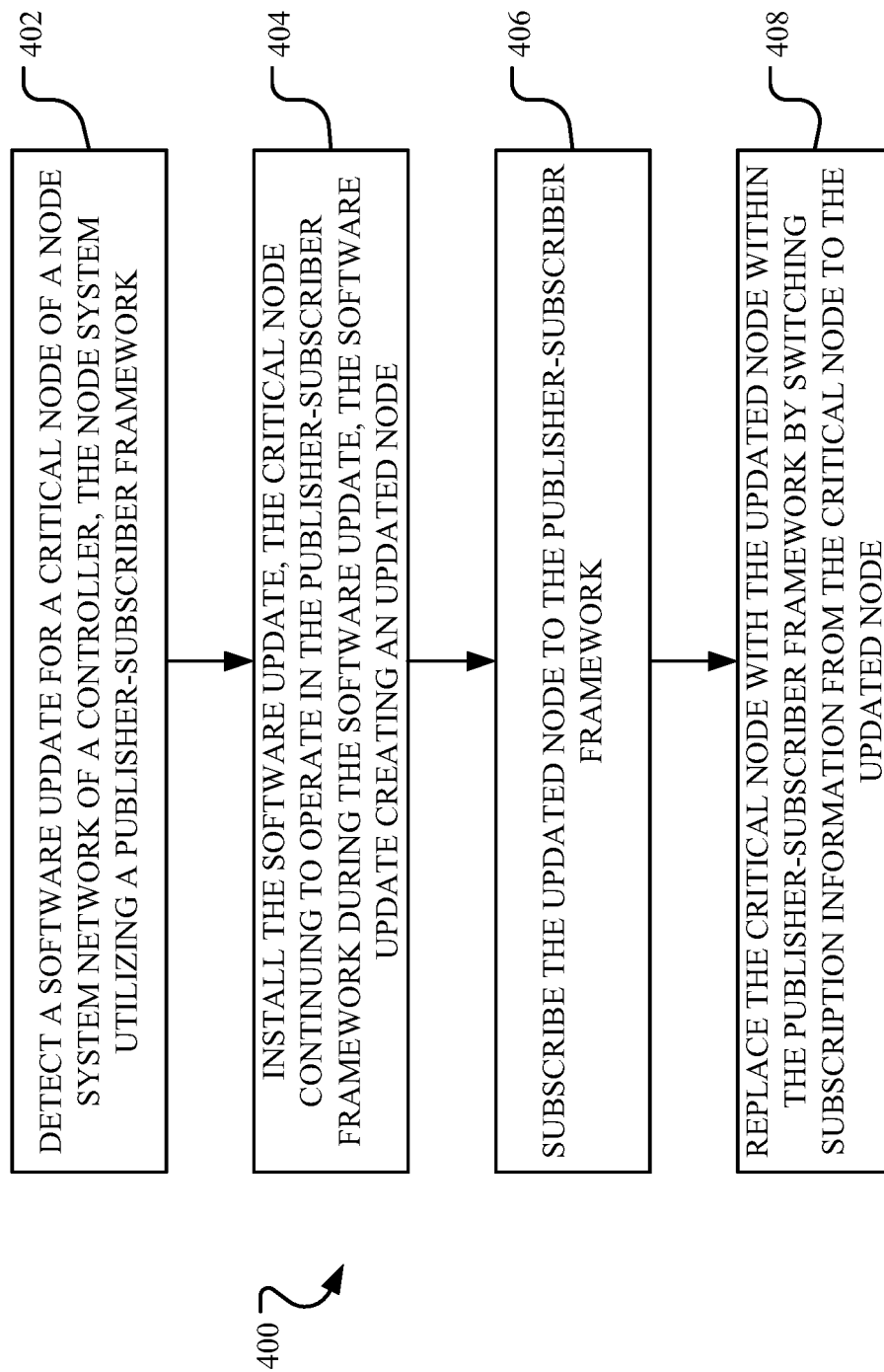
FIG. 9 illustrates example operations for providing a non-interruptive software update.

Referring to FIG. 9, examples operations 400 for a non-interruptive software update are illustrated. In one implementation, an operation 402 detects a software update for a critical node of a node system network of a controller of an autonomous vehicle. The node system network utilizes a publisher-subscriber framework. An operation 404 installs the software update with the critical node continuing to operate in the publisher-subscriber framework during the software update. The software update creates an updated node.

The updated node is deployed within the publisher-subscriber framework. Generally, the updated node may be deployed within the publisher-subscriber framework by updated node to the publisher-subscriber framework and removing the critical node from the publisher-subscriber framework. The critical node may continue to operate in the publisher-subscriber framework until removal from the publisher-subscriber framework, and the critical node may be killed following removal from the publisher-subscriber framework.

In one implementation, an operation 406 subscribes the updated node to the publisher-subscriber framework, and an operation 408 replaces the critical node with the updated node within the publisher-subscriber framework by switching subscriber information from the critical node to the update node. Information published by the updated node may be validated prior to switching the subscriber information from the critical node to the updated node. Further, in some cases, information stored in local memory for the critical node may be migrated to the updated node prior to switching the subscriber information from the critical node to the updated node. The critical node may be killed following the subscriber information being switched from the critical node to the updated node.

In some implementations, prior to the operation 404 installing the software update, it may be determined whether update resources are within a resource threshold. The update resources corresponding to computing resources of the controller involved in the software update. The resource threshold may be calculated based on an identification of currently available computing resources of the controller and a tolerance level of computing resources of the controller. The operation 404 may automatically install the software update when the update resources are determined to be within the resource threshold. Otherwise, one or more non-critical nodes in the publisher-subscriber framework may be deactivated when the update resources are above the resource threshold. The one or more non-critical nodes are activated in the publisher-subscriber framework following replacement of the critical node with the updated node within the publisher-subscriber framework. In one implementation, the software update for the critical node is part of a larger software update. The larger software update may be separated into a plurality of subsets of software updates based on the resource threshold and a calculation of available computing resources created by deactivating one or more non-critical nodes. A first subset of the plurality of subsets of software updates includes the software update for the critical node, with the first subset being installed separate from remaining subsets of the plurality of subsets of software updates.

Figure 10:
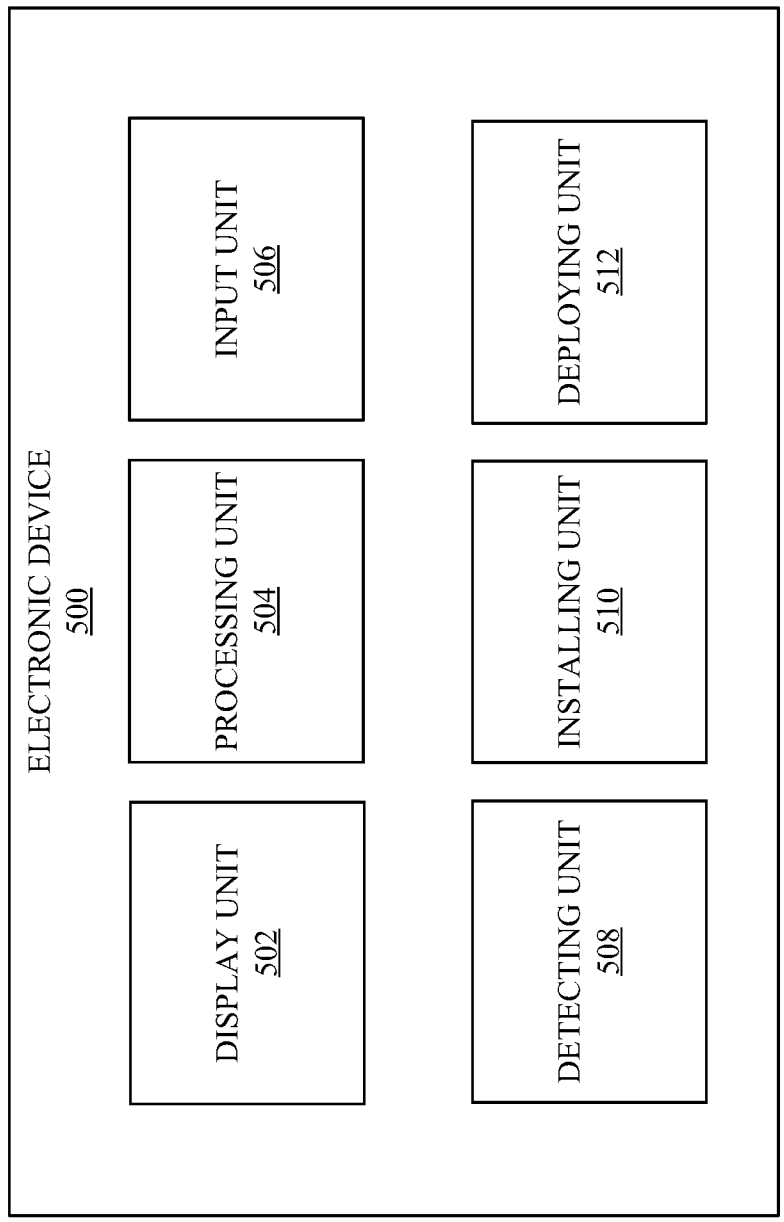
FIG. 10 is a functional block diagram of an electronic device including operational units arranged to perform various operations of the presently disclosed technology.

Turning to FIG. 10, an electronic device 500 including operational units 502-512 arranged to perform various operations of the presently disclosed technology is shown. The operational units 502-512 of the device 500 are implemented by hardware or a combination of hardware and software to carry out the principles of the present disclosure. It will be understood by persons of skill in the art that the operational units 502-512 described in FIG. 10 may be combined or separated into sub-blocks to implement the principles of the present disclosure. Therefore, the description herein supports any possible combination or separation or further definition of the operational units 502-512.

In one implementation, the electronic device 500 includes a display unit 502 configured to display information, such as a graphical user interface, and a processing unit 504 in communication with the display unit 802 and an input unit 506 configured to receive data from one or more input devices or systems. Various operations described herein may be implemented by the processing unit 504 using data received by the input unit 506 to output information for display using the display unit 502.

Additionally, in one implementation, the electronic device 500 includes units implementing the operations described with respect to FIG. 9. For example, the operation 402 may be implemented by a detecting unit 508, the operation 404 may be implemented by an installing unit 510, and the operations 406-408 may be implemented by a deploying unit 512.

Figure 11:
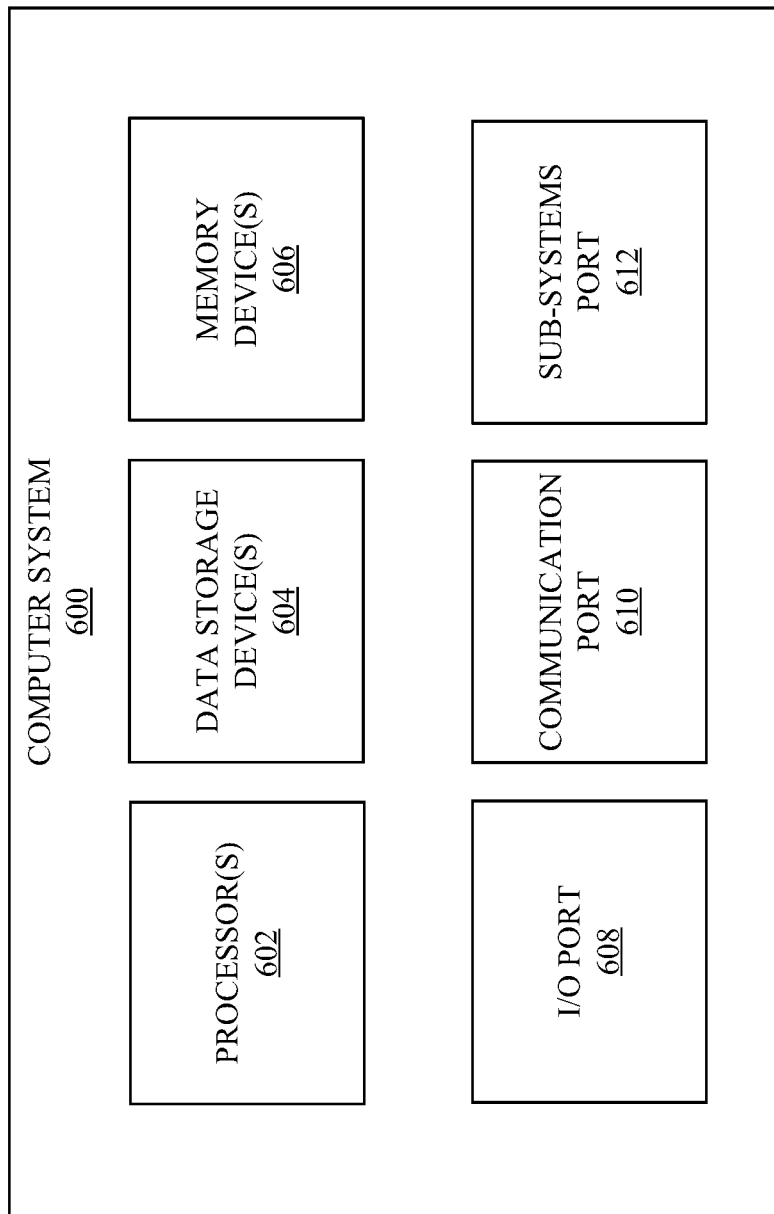
FIG. 11 is an example computing system that may implement various aspects of the presently disclosed technology.

Referring to FIG. 11, a detailed description of an example computing system 600 having one or more computing units that may implement various systems and methods discussed herein is provided. The computing system 600 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 11, including one or more hardware processors 602, one or more data storage devices 604, one or more memory devices 608, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 11.

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device (s) 606, and/or communicated via one or more of the ports 608-612, thereby transforming the computer system 600 in FIG. 11 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a sub-systems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular network, or over another communication means. Further, the communication port 610 may communicate with an antenna for electromagnetic signal transmission and/or reception. In some examples, an antenna may be employed to receive Global Positioning System (GPS) data to facilitate determination of a location of a machine, vehicle, or another device.

The computer system 600 may include a sub-systems port 612 for communicating with one or more systems related to a vehicle to control an operation of the vehicle and/or exchange information between the computer system 600 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, information, software and other modules and services for non-interruptive software updates may be embodied by instructions stored on the data storage devices 604 and/or the memory devices 606 and executed by the processor 602. The computer system 600 may be integrated with or otherwise form part of a vehicle. For example, the computer system 600 may be the controller 100. In some instances, the computer system 600 is a portable device that may be in communication and working in conjunction with various systems or sub-systems of a vehicle.

The present disclosure recognizes that the use of information corresponding to non-interruptive software updates may be used to the benefit of users. While location information may inform when and how software updates occur, it is recognized that collection and use of such information should be performed in a privacy-respectful manner. Users can selectively block use of, or access to, personal data, such as location or other information. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices. A system incorporating the present technologies can include hardware and/or software for safely handling the information.

The system set forth in FIG. 11 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
    identifying a software update for a device by communicating with a remote device, the device navigating along a travel path through an environment;
    receiving the software update from the remote device over a network;
    preparing the software update for a non-interruptive software update at the device, wherein the software update is prepared as the non-interruptive software update based on a resource threshold; and
    installing the non-interruptive software update at the device, wherein the non-interruptive software update installs as the device continues to navigate along the travel path.

2. The method of claim 1, wherein the software update is prepared as the non-interruptive software update based on whether the software update is a first type of software update or a second type of software update.

3. The method of claim 2, wherein the first type of software update is a critical software update and the second type of software update is a non-critical software update, the software update being prepared as the non-interruptive software update when the software update is the first type of software update.

4. The method of claim 3, wherein the software update is prepared as the non-interruptive software update when the software update is the second type of software update depending on a computing resource computation.

5. The method of claim 4, wherein the computing resource computation corresponds to update resources associated with completing the non-interruptive software update and computing resources associated with operating the device.

6. The method of claim 5, wherein the resource threshold is calculated for the computing resources based on currently available resources, the non-interruptive software update being automatically installed when the update resources are within the resource threshold.

7. The method of claim 6, wherein additional computing resources are obtained through squeezing when the update resources are outside the resource threshold.

8. The method of claim 7, wherein the software update is separated into a plurality of subsets when the update resources exceed the resource threshold and the additional computing resources, each of the plurality of subsets being within the resource threshold and prepared as a separate non-interruptive software update.

9. One or more tangible non-transitory computer-readable storage media storing computer-executable instructions for performing a computer process on a computing system, the computer process comprising:
    identifying a software update for a device by communicating with a remote device, the device configured to move within an environment;
    receiving the software update from the remote device over a network;
    preparing the software update for a non-interruptive software update at the device based on a resource threshold; and
    causing the non-interruptive software update to install at the device, wherein the non-interruptive software update installs as the device continues to move navigate-within the environment.

10. The one or more tangible non-transitory computer-readable storage media of claim 9, wherein the non-interruptive software update is transitioned into an interruptive software update based on the resource threshold.

11. The one or more tangible non-transitory computer-readable storage media of claim 9, wherein the software update is prepared as the non-interruptive software update based on whether the software update involves autonomy.

12. The one or more tangible non-transitory computer-readable storage media of claim 9, wherein the software update is prepared as the non-interruptive software update when the software update is a critical software update.

13. The one or more tangible non-transitory computer-readable storage media of claim 9, wherein the software update is prepared as the non-interruptive software update when update resources associated with completing the non-interruptive software update are within the resource threshold.

14. The one or more tangible non-transitory computer-readable storage media of claim 13, wherein the resource threshold corresponds to computing resources associated with operating the device.

15. The one or more tangible non-transitory computer-readable storage media of claim 14, wherein the resource threshold is calculated based on an identification of currently available computing resources of the computing resources and a tolerance level of the computing resources.

16. A system comprising:
- a device in communication with a remote device over a network, a software update for the device identified by communicating with the remote device over the network, the device configured to operate within an environment;
- a controller for the device receiving the software update from the remote device over the network and configured to prepare the software update for a non-interruptive software update at the device based on a resource threshold, the controller installing the non-interruptive software update, wherein the non-interruptive software update installs as the device continues to operate within the environment.

17. The system of claim 16, wherein the software update is prepared as the non-interruptive software update when the software update is a critical software update.

18. The system of claim 16, wherein the software update is prepared as the non-interruptive software update based on whether the software update involves autonomy.

\* \* \* \* \*